June 21, 1960        R. LEE        2,941,397
MILES-PER-GALLON MEASURING APPARATUS
Filed Nov. 1, 1956
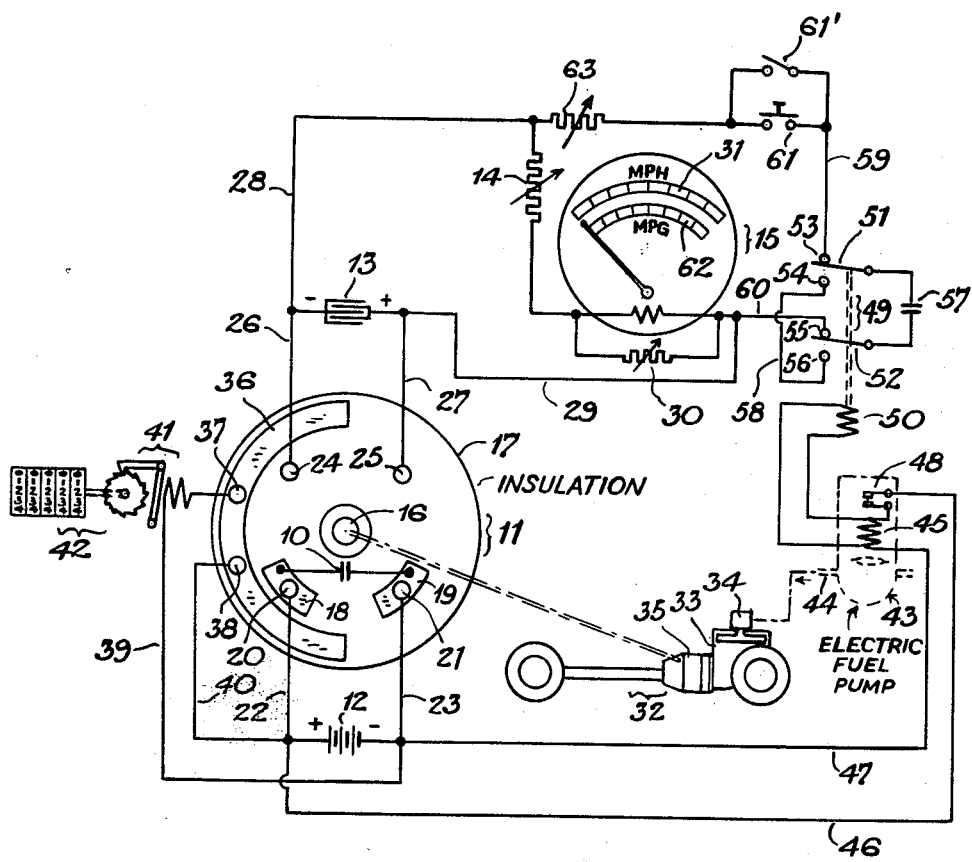
INVENTOR.
BY ROYAL LEE
Christopher L. Waal
ATTORNEY

2,941,397
MILES-PER-GALLON MEASURING APPARATUS

Royal Lee, Elm Grove, Wis., assignor to Lee Foundation for Nutritional Research, Milwaukee, Wis., a corporation of Wisconsin Filed Nov. 1, 1956, Ser. No. 619,703

4 Claims. (Cl. 73—114)

This invention relates to electrical systems for use in measuring quantities such as speed and rate of flow.

An object of the invention is to provide an improved electrical measuring system of the capacitor-charging type for indicating the speed of vehicles and other moving or rotating bodies.

Another object is to provide an electrical measuring system which will indicate the rate of fluid flow, such as the fuel consumption of an engine-driven vehicle.

A further object is to provide an electrical measuring system which will indicate both vehicle speed and rate of fuel consumption.

The invention further consists in the several features hereinafter described and claimed.

The accompanying drawing shows a schematic diagram of an electrical measuring system of the invention arranged as a vehicle speedometer and a miles-per-gallon meter.

In the drawing, 10 designates a first capacitor which is alternately charged and discharged through a suitable switch device 11 hereinafter more fully described, the capacitor being repeatedly charged in the same sense from a direct current source 12 such as a battery, and being discharged through the switch device into a second capacitor 13 of substantially larger capacitance from which current flows through a load circuit comprising a resistor 14 and a series-connected milliammeter 15 forming an indicator or measuring instrument. By way of example, the capacitor 10 may have a capacitance of ¼ microfarad, and the capacitor 13 may have a capacitance of 10 to 20 microfarads. The milliammeter is conveniently of the D'Arsonval type.

The switch device 11 is here shown to be of a rotary type driven by a shaft 16 which is rotatable in either direction, the frequency of switch operation being determined by the speed of the shaft. The switch device includes an insulating rotor disk 17 carried on the shaft 16 and having at one face a pair of flush contact segments 18 and 19 with their centers circumferentially spaced about 90°. The capacitor 10 is mounted on the disk and is connected to these contact segments. A first pair of suitably supported brushes 20 and 21 of any conventional spring-pressed type spaced about 90° apart bear on the face of the disk for engagement with the contact segments, these brushes being connected to the terminals of the battery 12 by respective conductors 22 and 23. A second pair of similar brushes 24 and 25 are disposed at the opposite side of the disk axis and are spaced about 90° apart, these brushes being connected to the terminals of the capacitor 13 by respective conductors 26 and 27. During the rotation of the shaft in either direction, the two pairs of brushes are alternately engageable with the pair of contact segments, the arrangement forming a double-pole double-throw switch for transferring increments of charge from the capacitor 10 to the capacitor 13. The capacitor 13 is connected by conductors 28 and 29 to a load comprising the milliammeter 15 and the resistor 14 in series therewith, the resistor preferably being adjustable. Current thus flows from the capacitor 13 through the milliammeter at a rate depending on the potential attained by this capacitor. The milliammeter is shunted by an adjustable calibrating resistor 30 which also forms a damping resistor. The milliammeter has a scale 31 graduated in suitable units such as miles per hour when the apparatus is used as a speedometer, or in revolutions per minute when the apparatus is used as a tachometer.

The first capacitor 10 is intermittently charged to a potential substantially equal to the battery potential, but during the discharge to the second capacitor 13 the potential on the first capacitor drops because of the substantially larger capacitance of the second capacitor and because of the current drain through the milliammeter. The successive increments of charge delivered to the capacitor 13 cause the potential on the latter capacitor to rise, and this potential increases with the frequency of switch operation and results in a greater flow of current through the milliammeter 15. The current flow through the milliammeter is therefore a measure of the shaft speed.

The system is here shown to be used as a speedometer for a wheeled motor vehicle 32, the vehicle having an engine 33 with a carburetor 34 and further having a transmission 35. The shaft 16 is driven at a suitable speed proportional to vehicle speed, for example about twice the wheel speed. The rotary switch device 11 is mounted on any convenient part of the vehicle, such as on the transmission case, and the shaft 16 is preferably driven from the output shaft of the transmission.

The switch device 11 is provided with a second switch section comprising an arcuate contact segment 36 about 180° in length carried on the disk 17 and engageable by a pair of brushes 37 and 38. These brushes are connected by respective conductors 39 and 40 to the battery 12, the conductor 39 including a ratchet-type reciprocatory electric motor 41 which actuates a counter or odometer 42.

The milliammeter 15 may be mounted at any convenient place on the vehicle, such as on the instrument panel or on a rear view mirror. Since the milliammeter is electrically operated it is not necessary to provide a flexible drive shaft or cable. If desired, one or more additional milliammeters may be provided, as in the rear compartment of the vehicle.

In the operation of the system thus far described, the disk-mounted capacitor 10 is alternately charged and discharged by the rotary switch device 11. In the diagram the capacitor 10 is shown in charging position. As the vehicle speed increases, the capacitor 13 receives more frequent increments of charge from the capacitor 10, increasing the potential on the capacitor 13. This causes more current to flow through the milliammeter 15 which indicates the vehicle speed. The odometer motor 41 is energized once for each revolution of the shaft 16 and actuates the odometer 42 to record the distance travelled.

The system further includes means to form a rate-of-flow meter such as for indicating miles per gallon of fuel consumed by the vehicle engine. The fuel is fed to the engine by an electromagnetically actuated diaphragm pump 43 of conventional type, the outlet of which is connected to the carburetor by a tube 44. One form of such pump is disclosed in United States Patent 2,179,925 to Dilg, issued November 14, 1939. The pump includes a reciprocating electric motor 45 supplied with current from the battery 12 through conductors 46 and 47. The motor is intermittently energized through a switch 48 at a variable rate according to the rate of fuel consumption, the switch 48 being actuated by a reciprocating part of the motor. A double-pole double-throw switch 49 is actuated synchronously with the fuel pump and is here shown to be actuated by an electromagnet 50 which is energized synchronously with the pump motor, as by connecting this electromagnet in parallel with the pump motor. However, in some instances the switch 49 may be mechanically actuated by a reciprocating part of the pump, like the pump switch 48. The switch 49 includes a pair of movable contacts 51 and 52, a pair of stationary contacts 53 and 54 selectively engageable by the contact 51, and a pair of stationary contacts 55 and 56 selectively engageable by the contact 52. A third capacitor 57, such as of about ¼ microfarad, is connected to the movable contacts 51, 52. The stationary contacts 54 and 56 are connected by a short-circuiting conductor 58, and the stationary contacts 53 and 55 are connected by respective conductors 59 and 60 to the terminals of the milliammeter 15, the conductor 59 having therein a normally open push-button switch 61. If desired, the switch 61 may be shunted by a normally open manually operable switch 61' which may be left in closed position. The milliammeter 15 is provided with a second scale 62 graduated in rate-of-consumption units, such as miles per gallon. The switch 49 is here shown to discharge the capacitor 57 when the pump motor is energized, but this relation may be reversed. Calibration of the meter for the miles-per-gallon indication can be effected in various ways, as by providing an adjustable resistor 63 in the conductor 59, or by varying the value of the capacitor 57.

When the system is to be used to indicate the rate of fuel consumption, the push-button switch 61, or the switch 61', is closed for a short period of time sufficient to obtain a meter reading on the scale 62. As the vehicle speed increases the meter reading will tend to increase, for the reasons hereinbefore set forth. With the engine idling or running at light load, the fuel pump 43 operates infrequently. When the pump switch 48 closes to energize the pump motor 45 the switch 49 will be energized to a position disconnecting the capacitor 57 from the capacitor 13 and short-circuiting the capacitor 57, and the meter reading will tend to increase. When the pump motor is deenergized the switch 49 is actuated to its other position, whereupon the capacitor 57 will receive a charge from the capacitor 13, thus slightly reducing the potential of the capacitor 13. Subsequent short-circuiting of the capacitor 57 by operation of the switch 49 will then dissipate the charge on the capacitor 57. As the engine load increases the fuel pump and switch 49 operate more frequently, with the result that the capacitor 13 is drained of its charge at a greater rate, causing the meter 15 to read lower, indicating a higher rate of fuel consumption. It will be seen that increase of vehicle speed tends to increase the meter deflection, while an increase in frequency of fuel pump operation, representing an increase in the rate of fuel consumption, tends to decrease the meter deflection. If the vehicle is at rest, but with the engine running, the meter will indicate zero miles-per-gallon.

The measuring system of the invention is also useful in other applications such as in dynamometers.

I claim:

1. In a measuring system for an engine-driven vehicle having fuel supply means, a source of direct current, a first capacitor, a second capacitor of substantially larger capacitance than said first capacitor, vehicle speed responsive means for alternately charging said first capacitor from said source and connecting said first capacitor to said second capacitor to transfer increments of charge to said second capacitor, current responsive meter means in circuit with said second capacitor, a charge-dissipating circuit including a third capacitor, and switch means responsive to the rate of fuel flow from said fuel supply means for intermittently connecting said charge-dissipating circuit to said second capacitor for reducing the potential on said second capacitor.

2. In a measuring system, a source of direct current, capacitor means, speed responsive means for periodically impressing a charge on said capacitor means from said source, current responsive means in circuit with said capacitor means, and liquid flow responsive means for intermittently discharging energy from said capacitor means, said liquid flow responsive means including an intermittently operating pump and intermittently operable switch means controlled thereby and operable at the pump frequency.

3. In a combined speedometer and fuel consumption meter for an engine-driven vehicle having fuel supply means, a source of direct current, capacitor means, speed responsive means for periodically impressing a charge on said capacitor means from said source, charge-dissipating means, switch means responsive to the rate of fuel flow from said fuel supply means selectively connected to said capacitor means for intermittently discharging energy from said capacitor means, and a current responsive meter in circuit with said capacitor means and having a speed scale and a fuel consumption scale.

4. In a measuring system for indicating the rate of fuel consumption of an engine-driven vehicle having an intermittently operated electric fuel pump, a capacitor, means responsive to vehicle speed for increasing the potential of said capacitor, means responsive to frequency of pump operation for decreasing the potential of said capacitor, and current responsive meter means connected in circuit with said capacitor.

References Cited in the file of this patent

UNITED STATES PATENTS

| | | |
|---|---|---|
| 697,492 | Kelly et al. | Apr. 15, 1902 |
| 1,665,857 | Needham | Apr. 10, 1928 |
| 2,250,125 | Chisholm | July 22, 1941 |
| 2,330,159 | Thompson | Sept. 21, 1943 |
| 2,473,542 | Philpott | June 21, 1949 |